(12) United States Patent
Coates et al.

(10) Patent No.: US 6,316,590 B1
(45) Date of Patent: Nov. 13, 2001

(54) SYNTHESIS OF STEREOSPECIFIC AND ATACTIC POLY(LACTIC ACID)S

(75) Inventors: Geoffrey W. Coates, Ithaca, NY (US); Ming Cheng, Oakdale, MN (US); Bradley M. Chamberlain, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/707,980

(22) Filed: Nov. 8, 2000

Related U.S. Application Data

(60) Provisional application No. 60/164,606, filed on Nov. 10, 1999.

(51) Int. Cl.[7] ............................. C08G 63/82; B01J 31/00
(52) U.S. Cl. ........................ 528/357; 528/358; 528/359; 502/155; 502/159; 502/200; 502/324; 502/340
(58) Field of Search ..................................... 528/357, 358, 528/359; 502/155, 159, 200, 324, 340

(56) References Cited

U.S. PATENT DOCUMENTS

| | | | |
|---|---|---|---|
| 3,268,487 | 8/1966 | Klootwijk et al. | 528/355 |
| 4,719,246 | 1/1988 | Murdoch et al. | 521/134 |
| 4,766,182 | 8/1988 | Murdoch et al. | 525/413 |
| 4,800,219 | 1/1989 | Murdoch et al. | 525/413 |
| 4,902,515 | 2/1990 | Loomis et al. | 313/486 |
| 5,346,966 | 9/1994 | Spinu | 525/411 |
| 5,440,007 | 8/1995 | Gross et al. | 528/354 |
| 5,770,682 | * 6/1998 | Ohara et al. | 528/354 |
| 5,820,664 | 10/1998 | Gardiner et al. | 106/287.17 |
| 5,821,327 | * 10/1998 | Oota et al. | 528/354 |
| 5,840,811 | 11/1998 | Hori et al. | 525/411 |
| 5,840,897 | 11/1998 | Kirlin et al. | 546/2 |
| 6,133,402 | 10/2000 | Coates et al. | 528/196 |

OTHER PUBLICATIONS

Cheng, M., et al., Polymer Preprints 40(1), 542–543 (3/99).
Cheng, M., et al., J. Am. Chem. Soc. 121, 11583–15584 (Nov. 24, 1999).
Bero, M., et al., J. Polym. Sci. Part A: Polym. Chem. 37, 4038–4042 (1999).
Kasperczyk, J. E., Macromolecules, 28, 3937–3939 (1995).

\* cited by examiner

*Primary Examiner*—Samuel A. Acquah

(57) ABSTRACT

Isotactic poly ((R)-lactic acid) or isotactic poly (S)-lactic acid are respectively prepared from (R,R)-lactide and (S,S)-lactide using a catalyst which has a zinc center or a magnesium center and two ligands where one of the ligands is a propagating group and the other of the ligands is not a propagating group. Heterotactic poly(lactic acid) is prepared from rac-lactide using a catalyst which has a zinc center and two ligands where one of the ligands is a propagating group and the other of the ligands is not a propagating group; heterotactic poly(lactic acid) is a novel composition. The catalyst with a magnesium center is a novel catalyst. Syndiotactic poly(lactic acid) is prepared from meso-lactide using a syndiotactic poly(lactic acid) effecting catalyst which has a zinc center and two ligands where one of the ligands is a propagating group and the other of the ligands is not a propagating group and the preferred catalyst contains as the ligand which is not a propagating group diiminate substituted with isopropyl substituted phenyl and the propagating group is isopropoxide. Atactic poly(lactic acid) of polydispersity ranging from 1.15 to 1.40 is prepared in less than 10 minutes by polymerizing rac-lactide in the presence of $C_1$–$C_4$ alcohol and a catalyst with a magnesium center and two ligands where one of the ligands is a propagating group and the other of the ligands is not a propagating group.

19 Claims, 1 Drawing Sheet

SYNTHESIS OF STEREOSPECIFIC AND ATACTIC POLY(LACTIC ACID)S

CROSS-REFERENCE TO RELATED APPLICATION

This application claims the benefit of U.S. Provisional Application No. 60/164,606, filed Nov. 10, 1999, the whole of which is incorporated herein by reference.

This invention is made at least in part with Government support under National Science Foundation Career Award CHE 9875261. The Government has certain rights in the invention.

TECHNICAL FIELD

The invention is directed at methods of making isotactic poly((R)-lactic acid), isotactic poly ((S)-lactic acid), heterotactic poly(lactic acid), syndiotactic poly(lactic acid), and atactic polylactic acid of narrow polydispersity. The invention is also directed at heterotactic poly(lactic acid) as a novel composition of matter. The invention is also directed at novel zinc centered single-site catalysts and at novel Mg centered catalysts.

BACKGROUND OF THE INVENTION

Poly(lactic acid)s (PLA)s are considered useful for medical, agricultural and packaging applications due to their biocompatibility and biodegradability. In view of this, it is desirable to provide new stereospecific forms of poly(lactic acid)s and new methods of preparing known forms of poly(lactic acid)s.

A convenient synthetic route to PLAs is the ring-opening polymerization of lactide, the cyclic diester of lactic acid. A range of metal alkoxide initiators have been reported to polymerize lactide with retention of configuration. For example, these initiators have been reported to polymerize optically active (R,R)-lactide or (S,S)-lactide to produce isotactic poly(lactic acid). Moreover, these initiators have been reported to polymerize rac-lactide to produce amorphous, atactic polymers. Polymerization of rac-lactide to produce heterotactic poly(lactic acid) or any other method of producing this PLA has not heretofore been known.

SUMMARY OF THE INVENTION

It has been discovered herein that isotactic poly ((R)-lactic acid) and isotactic poly ((S)-lactic acid) can be prepared using different catalysts than have heretofore been used for this purpose and that rac-lactide can be polymerized to form the novel stereospecific poly(lactic acid) heterotactic poly(lactic acid). It has also been discovered that syndiotactic poly(lactic acid) can be prepared from meso-lactide using a catalyst with a zinc center and two ligands. It has also been discovered that atactic poly(lactic acid) of low polydispersity can be prepared from rac-lactide using magnesium centered catalysts with two ligands in the presence of $C_1$–$C_4$ alcohol.

One embodiment herein, denoted the first embodiment, is directed to a method of preparing isotactic poly ((R)-lactic acid) which comprises polymerizing (R,R)-lactide in the presence of a catalyst which has a zinc center or a magnesium center, and two ligands where one of the ligands is a propagating group and the other of the ligands is not a propagating group, or is dimer thereof Another embodiment herein, denoted the second embodiment, is directed to a method of preparing isotactic poly ((S)-lactic acid) which comprises polymerizing (S,S)-lactide in the presence of a catalyst which has a zinc center or a magnesium center; and two ligands where one of the ligands is a propagating group and the other of the ligands is not a propagating group.

Still another embodiment herein, denoted the third embodiment, is directed to heterotactic poly(lactic acid).

Yet another embodiment herein, denoted the fourth embodiment, is directed to a method for preparing heterotactic poly (lactic acid) which comprises polymerizing rac-lactide in the presence of a catalyst which has a zinc center and two ligands where one of the ligands is a propagating group and the other of the ligands is not a propagating group, or is dimer thereof.

Yet another embodiment herein, denoted the fifth embodiment, is directed to magnesium centered catalysts having the structure:

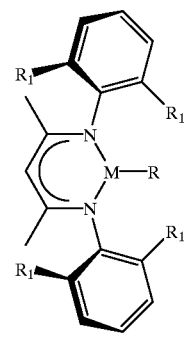

where M is magnesium, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl, and $R_1$ is selected from the group consisting of ethyl and isopropyl, or is dimer thereof.

Still another embodiment, denoted the sixth embodiment herein, is directed to a single-site catalyst for lactide polymerization containing a β-diiminate ligand which remains bound to a zinc center which is joined to a ligand which initiates polymerization.

Still another embodiment, denoted the seventh embodiment herein, is directed to a method for preparing syndiotactic poly(lactic acid) which comprises polymerizing meso-lactide in the presence of a syndiotactic poly(lactic acid) effecting catalyst which has a zinc center and two ligands where one of the ligands is a propagating group and the other of the ligands is not a propagating group.

Yet another embodiment, denoted the eighth embodiment herein, is directed to a method for preparing atactic poly (lactic acid) with polydispersity $M_\omega/M_n$ ranging from 1.15 to 1.40 as determined by gel permeation chromatography versus monodispersed polystyrene standards. The method comprises polymerizing rac-lactide in the presence of a catalyst which has a magnesium center and two ligands where one of the ligands is a propagating group and the other of the ligands is not a propagating group and the polymerization is carried out in the presence of 0.5 to 2 equivalents of $C_1$–$C_4$ alcohol per mole of magnesium.

The term "heterotactic poly(lactic acid) is used herein to mean stereospecific polymer that has alternating pairs of stereogenic centers in the main chain. It may also be called syndiotactic poly(rac-lactide).

Herein, "Me" is used to mean methyl; "Et" is used to mean ethyl; "Bu" is used to mean butyl; "IPr" and "iPr" and "Pr" are used to mean isopropyl; "OAc" is used to mean acetate; and "BDI" is used to mean β-diimine.

DETAILED DESCRIPTION

Figure 1:
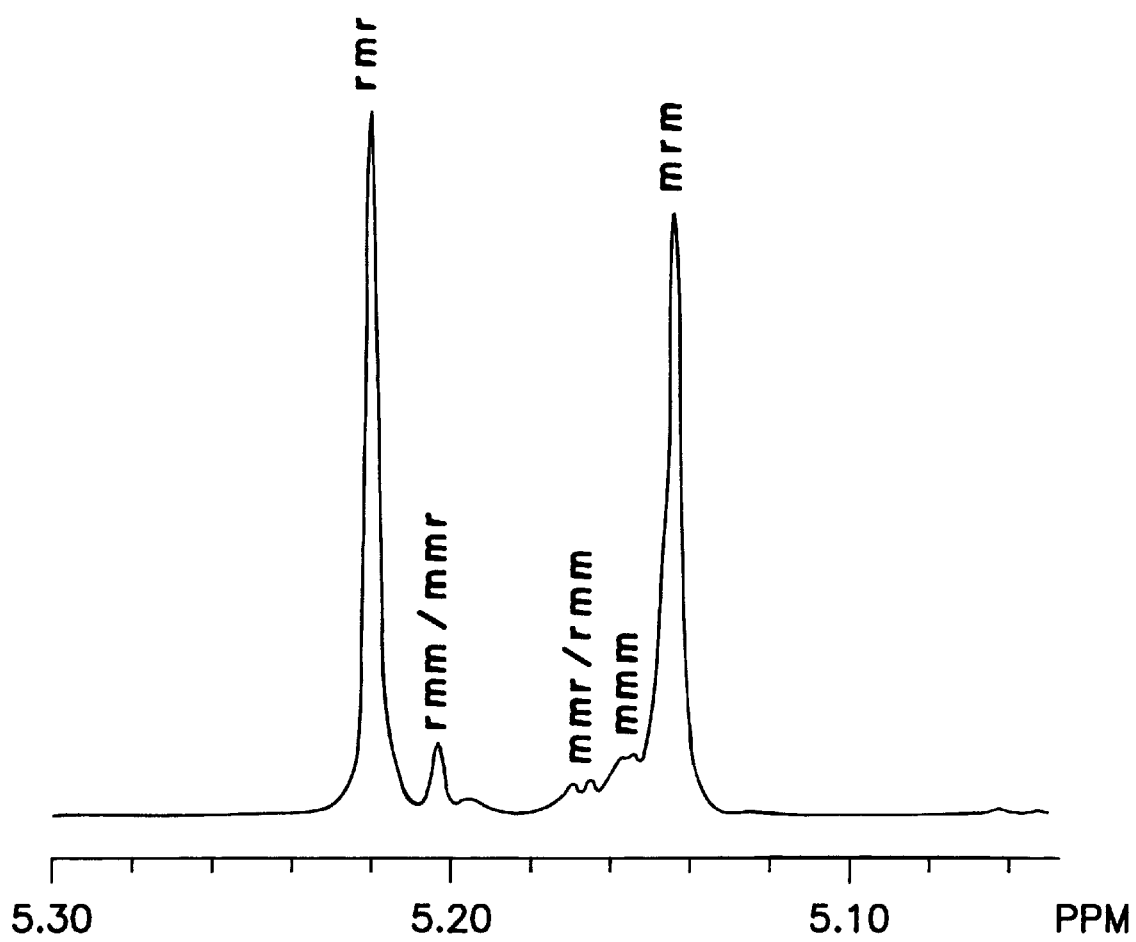
FIG. 1 is a homonuclear decoupled $^1$HNMR spectrum of the methine region of heterotactic poly(lactic acid) prepared in Example V.

We turn now to the first embodiment herein, that is the method of preparing isotactic poly ((R) lactic acid) which comprises polymerizing (R,R)-lactide in the presence of a catalyst which has a zinc center or a magnesium center, and two ligands where one of the ligands is a propagating group and the other of the ligands is not a propagating group, or is dimer thereof.

The (R,R)-lactide is available commercially.

The catalyst for the first embodiment preferably has the structure

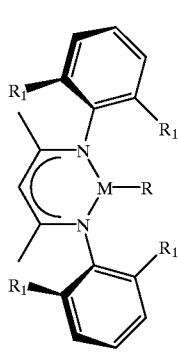

(I)

where M is selected from the group consisting of zinc and magnesium, R is selected from the group consisting of OAc, OR$^2$ where R$^2$ is selected from the group consisting of $C_6$–$C_{20}$ aryl and $C_1$–$C_{20}$ alkyl, N(SiMe$_3$)$_2$ and $C_1$–$C_{20}$ alkyl, e.g., ethyl, and R$_1$ is selected from the group consisting of ethyl and isopropyl or is dimer thereof.

Some of these catalysts and their methods of preparation are set forth in U.S. Pat. No. 6,133,402, the whole of which is incorporated herein by reference. The catalyst having the structure (I) where M is zinc, R$_1$ is isopropyl and R is OAc, denoted (BDI$^{iPr}$)ZnOAc herein, is denoted catalyst A in U.S. Pat. No. 6,133,402 and its synthesis is described in Example I of U.S. Pat. No. 6,133,402; it exists as a dimer in the solid state. The catalyst having the structure (I) where M is zinc, R$_1$ is ethyl and R is OAc is denoted catalyst B in U.S. Pat. No. 6,133,402 and its synthesis is described in Example II of U.S. Pat. No. 6,133,402; it exists as a dimer in the solid state. The catalyst having the structure (I) where M is zinc, R$_1$ is isopropyl, and R is OMe, denoted [(BDI$^{iPr}$)ZnOMe] herein, is denoted catalyst C in U.S. Pat. No. 6,133,402 and its synthesis is described in Example III of U.S. Pat. No. 6,133,402. The catalyst having the structure (I) where M is zinc, R$_1$ is ethyl, and R is OMe is denoted catalyst D in U.S. Pat. No. 6,133,402 and its synthesis is described in Example IV of U.S. Pat. No. 6,133,402; it exists as a dimer in the solid state.

The catalyst having the structure (I) where M is zinc, R is N(SiMe$_3$)$_2$, and R$_1$ is isopropyl, denoted [(BDI$^{iPr}$)ZnN(TMS)$_2$], is prepared by reacting bis(bis(trimethylsilyl) amide, denoted Zn(N(TMS)$_2$)$_2$, with β-diimine, denoted (BDI$^{iPr}$)H, prepared by refluxing two equivalents of 2,6-diisopropyl aniline with 2,4-pentane dione as described in Feldman, J., et al., Organometallics, 16, 1514–1516 (1997). The Zn(N(TMS)$_2$)$_2$ is available commercially. The reaction of the Zn(N(TMS)$_2$)$_2$ and the β-diimine is readily carried out in a mole ratio of 0.5:1 to 2:1, preferably 1:1, at a temperature ranging from 60° C. to 90° C., preferably 80° C., in non-protic kind of solvent, e.g., toluene.

The catalyst having the structure (I) where M is zinc, R is N(SiMe$_3$)$_2$, and R$_1$ is ethyl, denoted [(BDI$^{Et}$)ZnN(TMS)$_2$], is prepared by reacting Zn(N(TMS)$_2$)$_2$ with β-diimine, denoted (BDI$^{Et}$)H, prepared the same way as the β-diimine prepared in the paragraph directly above, except that 2,6-diethyl aniline is used in place of 2,6-diisopropylaniline. The reaction of the Zn(N(TMS)$_2$)$_2$ with β-diimine is readily carried out in a mole ratio of 0.5:1 to 2:1, preferably 1:1, at a temperature ranging from 60° C. to 90° C., preferably 80° C., in a non-protic kind of solvent, e.g., toluene.

The catalyst having the structure (I) where M is zinc, R is Et and R$_1$ is isopropyl, denoted [(BDI$^{iPr}$)ZnEt], is readily prepared by reacting diethyl zinc with β-diimine prepared the same way as the β-diimine described two paragraphs above. The reaction is readily carried out in a mole ratio of 0.5:1 to 2:1, preferably 1:1, at a temperature ranging from 60° C. to 90° C., preferably 80° C., in non-protic kind of solvent, e.g., toluene.

The catalyst having the structure (I) where M is zinc, R is isopropoxide and R$_1$ is [(BDI$^{iPr}$)ZnO$^i$Pr]$_2$ isopropyl, denoted [(BDI$^{iPr}$)ZnO$^i$Pr]$_2$ is readily prepared by reacting 2-propanol with [(BDI$^{iPr}$)Zn(TMS)$_2$]. The reaction is readily carried out in a mole ratio of 2-propanol to [(BDI$^{iPr}$)Zn(TMS)$_2$] of 0.5:1 to 2:1, preferably 1:1, at a temperature ranging from 10 to 30° C., preferably 20° C., in non-protic kind of solvent, e.g., toluene. This catalyst has been determined by X-ray diffraction to be in dimeric form.

The catalysts having the structure (I) where M is magnesium can be prepared by reacting dibutyl magnesium with β-diimine, e.g., (BDI$^{Et}$)H to obtain product with R$_1$ being ethyl, and reacting the product with appropriate alcohol to obtain R being OR$^2$. The mole ratios can be, for example, 0.5:1 to 2:1, preferably about 1:1, mole ratios of dibutyl magnesium to β-diimine and 0.5:1 to 2:1, preferably about 1:1, of product to alcohol. The reaction temperature of the first step can be, for example, 60–90° C., preferably 80° C., and the second step can be carried out at room temperature. Both steps can be carried out in non-protic kind of solvent, e.g., toluene. For example, the catalyst having the structure (I) where M is magnesium, R is OMe and R$_1$ is ethyl is readily prepared by adding (BDI$^{Et}$)H to a solution of dibutyl magnesium (in heptane) in toluene in about a 1:1 mole ratio, then stirring overnight at 80° C. and obtaining [(BDI$^{Et}$)MgBu], then adding methanol to dried [(BDI$^{Et}$)MgBu] in toluene in about a 1:1 mole ratio at room temperature and stirring for an hour at room temperature.

Catalyst having the structure (I) where M is magnesium, R is isoproxide and R$_1$ is [(BDI$^{iPr}$)MgO$^i$Pr]$_2$ isopropyl, denoted [(BDI$^{iPr}$)MgO$^i$Pr]$_2$ can be prepared by reacting 2-propanol with compound having structure (I) where M is magnesium, R$_1$ is isopropyl and R is N(SiMe$_3$)$_2$, denoted [(BDI$^{iPr}$)MgN(SiMe$_3$)$_2$]. The reaction is readily carried out using a mole ratio of 2-propanol to [(BDI$^{iPr}$)MgN(SiMe$_3$)$_2$] of 0.5 to 2:1, preferably about 1:1, at a temperature ranging from 10 to 30° C., preferably room temperature, in a non-protic kind of solvent, e.g., toluene. The starting material [(BDI$^{iPr}$)MgN(SiMe$_3$)$_2$] can be prepared by reacting the same β-diimine used for preparing [(BDI$^{iPr}$)ZnN(TMS$_2$)$_2$] with magnesium bis(trimethylsilyl)amide, using a mole ratio of diimine to magnesium compared ranging from 0.5:1 to 2:1, preferably about 1:1, at a temperature ranging from 60° C. to 90° C., preferably 80° C., in a non-protic kind of solvent, e.g., toluene.

The polymerization of the (R,R)-lactide in the presence of catalyst of the structure (I) is readily carried out as follows: The catalyst is dissolved in methylene chloride and the resulting solution is added to a solution of (R,R)-lactide in methylene chloride in a mole ratio of monomer to metal ranging from 20:1 to 2,000:1, at a temperature ranging from 10 to 30° C., for 1 to 200 minutes. Quenching is readily carried out with methanol, and polymer is readily recovered by concentrating in vacuo, precipitating with excess methanol and drying in vacuo. (R,R)-Lactide is available commercially.

The reaction is represented by the following reaction equation:

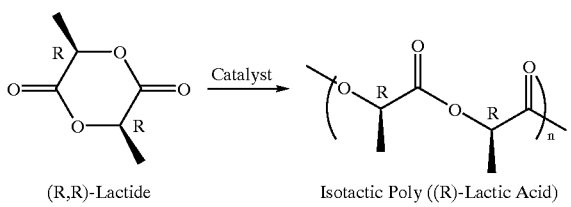

(R,R)-Lactide      Isotactic Poly ((R)-Lactic Acid)

where n ranges from 20 to 2,000.

We turn now to the second embodiment herein, that is the method of preparing isotactic poly((S) lactic acid), which comprises polymerizing (S,S)-lactide in the presence of a catalyst which has a zinc center or a magnesium center, and two ligands where one of the ligands is a propagating group and the other of the ligands is not a propagating group, or is dimer thereof.

The second embodiment is carried out the same as the first embodiment except that (S,S)-lactide is used in place of (R,R)-lactide. (S,S)-Lactide is available commercially.

We turn now to the third embodiment herein which is heterotactic poly(lactic acid). It is represented by the formula:

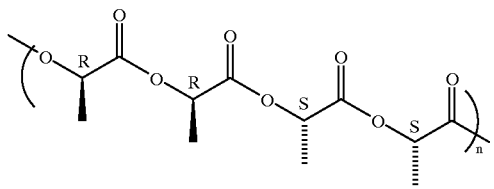

where n ranges from 20 to 2,000. The heterotactic poly (lactic acid) is readily made by the method of the fourth embodiment herein as described below.

We turn now to the fourth embodiment herein which is directed to a method for preparing heterotactic poly(lactic acid) which comprises polymerizing rac-lactide in the presence of a catalyst which has a zinc center and two ligands where one of the ligands is a propagating group and the other of the ligands is not a propagating group, or is dimer thereof.

The rac-lactide, that is racemic lactide, is an admixture of (R,R)-lactide and (S,S)-lactide in a 1:1 ratio. It is commercially available.

The catalyst for the fourth embodiment preferably has the structure

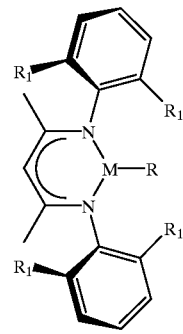

(I)

wherein M is zinc, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$, e.g., ethyl, and $R_1$ is selected from the group consisting of ethyl and isopropyl, or is dimer thereof. The synthesis for the catalysts for this embodiment is described above in a conjunction with the first embodiment. The catalysts used in working Example V directed to the fourth embodiment are synthesized in working Example I.

The reaction of the fourth embodiment can be carried out in a non-protic kind of solvent, e.g., methylene chloride, in a mole ratio of rac-lactide to catalyst ranging from 20 to 2,000, at a temperature ranging from 0 to 150° C. for a time ranging from 10 minutes to 10 hours.

Use of lower temperatures for longer times increased $P_r$. $P_r$ is the probability of a racemic replacement between monomer units (i.e., (R,R) followed by (S,S) or vice versa).

We turn now to the fifth embodiment which is directed to the magnesium centered catalysts as described above in the Summary of the Invention. The synthesis of these catalysts is described in conjunction with the first embodiment.

We turn now to the sixth embodiment, i.e., the embodiment directed to a single-site catalyst for lactide polymerization containing a β-diimine ligand which remains bound to a zinc center which is joined to a ligand which initiates polymerization.

Catalyst for the sixth embodiment has the structure:

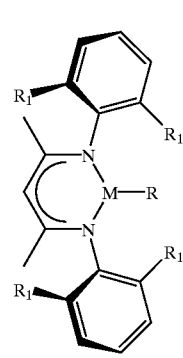

(I)

where M is zinc, R is $OR^2$ where $R^2$ is isopropyl and $R_1$ is isopropyl, or is dimer thereof. A method of synthesis for this catalyst is described above and in working Example I hereafter.

We turn now to the seventh embodiment, that is the method of preparing syndiotactic poly(lactic acid) which comprises polymerizing meso-lactide in the presence of a syndiotactic poly(lactic acid) effecting catalyst which has a zinc center and two ligands where one of the ligands is a propagating group and the other of the ligands is not a propagating group.

The syndiotactic poly(lactic acid) is represented by the formula:

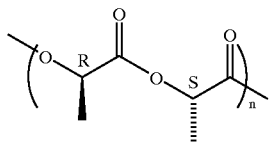

where n ranges from 20 to 2,000.

The meso-lactide has the structure:

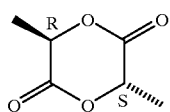

and can be prepared as described in Ovitt, T., et al., J. Am. Chem. Soc. 121, 4072–4073 (1999).

A catalyst for the seventh embodiment has the structure:

(I)

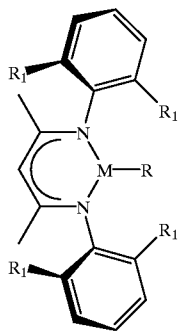

where M is zinc, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl and $R_1$ is isopropyl, or is dimer thereof. The catalyst used in working Example VI has the structure (I) where R is $OR^2$ where $R^2$ isopropyl.

The reaction of the seventh embodiment can be carried out in a non-protic kind of solvent, e.g., methylene chloride, in a mole ratio of meso-lactide to catalyst ranging from 20 to 2,000, at a temperature ranging from 0 to 150° C. for a time ranging from 10 minutes to 10 hours.

We turn now to the eighth embodiment, that is the method for preparing atactic poly(lactic acid) with a polydispersity $M_w/M_n$ ranging from 1.15 to 1.40 as determined by gel permeation chromatography versus nondispersed polystyrene standards. The method comprises polymerizing rac-lactide in the presence of a catalyst which has a magnesium center and two ligands where one of the ligands is a propagating group and the other of the ligands is not a propagating group and the polymerization is carried out in the presence of 0.5 to 2 equivalents of $C_1$–$C_4$ alcohol per mole of magnesium.

The atactic poly(lactic acid) contains random placements of -(RR)- and -(SS)-stereosequences and has from 20 to 2,000 of these stereosequences.

As indicated above, the rac-lactide, that is racemic lactide, is an admixture of (R,R)-lactide and (S,S)-lactide in a 1:1 ratio and is commercially available.

The catalyst for the eighth embodiment has the structure:

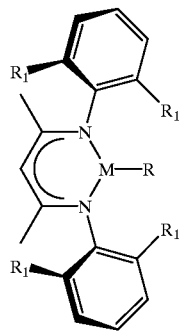

where M is magnesium, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl and $R_1$ is selected from the group consisting of ethyl and isopropyl, or is dimer thereof; and preferably has the structure (I) where R is $OR^2$ where $R^2$ is isopropyl and $R_1$ is isopropyl and is a dimer.

The $C_1$–$C_4$ alcohol is preferably isopropanol.

The reaction of the eighth embodiment can be carried out in a non-protic kind of solvent, e.g., methylene chloride, in a mole ratio of rac-lactide to catalyst ranging from 20 to 2,000 where the lactide, catalyst and alcohol are all mixed together simultaneously in the solvent. The reaction can be carried out, for example, at a temperature ranging from 0 to 150° C. for a time ranging from 0.5 to 20 minutes with conversion of 95% or more.

Elements of the invention are described in a publication cited as Cheng, M., et al., Polymer Preprints, 1999, 40(1), 542–543, copy attached as Appendix A to and forms part of U.S. Provisional Application No. 60/164,606, and in a manuscript of Cheng, M., et al. titled "Single-Site Catalysts for Ring-Opening Polymerization: Synthesis of Heteotactic Poly(lactic acid) from rac-Lactide," copy attached as Appendix B to and forms part of U.S. Provisional Application No. 60/164,606 which published as Cheng, M., et al., J. Am. Chem. Soc. 121, 11583–11584 (1999) on Nov. 24, 1999.

The invention is illustrated in the following working examples:

EXAMPLE I

Synthesis of Catalysts

Syntheses of some of the catalysts used in following working examples are set forth below. In the following description $(BDI^{Et})H$ and $(BDI^{iPr})H$ have the structural formula

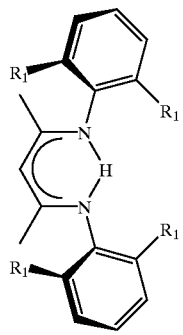

where $R_1$ is respectively ethyl and isopropyl.

The syntheses follow:

[(BDI$^{iPr}$)ZnN(TMS)$_2$]. A solution of (BDI$^{iPr}$)H (3.045 g, 7.29 mmol) in toluene (15 ml) was added into zinc bis(trimethylsilyl)amide (3.0 ml, 7.2 mmol) in toluene (5 ml) at 20° C. After stirring 6 days at 80° C., the clear, yellow green solution was dried in vacuo, giving [(BDI$^{iPr}$)ZnN(TMS)$_2$] in quantitative yield (4.64 g). The light yellow solid was recrystallized from toluene (10 ml) at −30° C. (3.52 g, 76% yield). $^1$H NMR (C$_6$D$_6$, 300 MHz) δ7.13 (6H, m, ArH), 4.85 (1H, s, β-CH), 3.24 (4H, m, J=7.0 Hz, CHMe$_2$), 1.66 (6H, s, α-Me), 1.37 (12H, d, J=7.0 Hz, CHMeMe'), 1.12(12H, d, J=7.0 Hz, CHMeMe'),−0.01 (18H, s, SiCH$_3$).

[(BDI$^{Et}$)ZnN(TMS)$_2$]. A solution of (BDI$^{Et}$)H (0.369 g, 1.02 mmol) in toluene (5 ml) was added to a solution of [Zn(N(TMS)$_2$)$_2$] (0.42 ml, 1.01 mmol) in toluene (5 ml) at 0° C. After stirring overnight at 80° C., the clear, colorless solution was dried in vacuo, giving the desired compound in quantitative yield (0.59 g). $^1$H NMR (C$_6$D$_6$, 300 MHz) δ7.11 (6H, m, ArH), 4.87 (1H, s, β-CH), 2.73 (4H, m, J=7.5 Hz, CH$_2$CH$_3$), 2.60 (4H, m, J=7.5 Hz, CH$_2$CH$_3$), 1.58 (6H, s, α-CH$_3$), 1.21 (12H, app. t, J=7.5 Hz, CH$_2$CH$_3$), −0.03 (18H, s, SiCH$_3$).

[BDI$^{iPr}$)ZnEt]. To a solution of diethyl zinc (0.61 ml, 5.95 mmol) in toluene (10 ml) was slowly added (BDI$^{iPr}$)-H (0.501 g, 1.196 mmol) in toluene (10 ml) at 0° C. After stirring overnight at 80° C., the clear solution was dried in vacuo, giving a quantitative yield (0.61 g) of the desired compound. $^1$H NMR (C$_6$D$_6$, 300 MHz) δ7.07 (6H, m, ArH), 4.98 (1H, s, β-CH), 3.18 (4H, m, CHMe$_2$), 1.69 (6H, s, α-Me), 1.25 (12H, d, J=7.0 Hz, CHMeMe'), 1.14 (12H, d, J=7.0 Hz, CHMeMe'), 0.89 (3H, t, J=8.0 Hz, CH$_2$CH$_3$), 0.24 (2H, q, J=8.0 Hz, CH$_2$CH$_3$).

[(BDI$^{iPr}$)ZnOMe]$_2$. To a solution of [(BDI$^{iPr}$)ZnEt] (1.196 mmol) in toluene (10 ml) was added methanol (0.24 ml, 5.91 mmol) at RT. After stirring for an hour at RT, the clear solution was dried in vacuo (0.604 g., 98% yield). $^1$H NMR (C$_6$D$_6$, 300 MHz) δ7.13 (6H, m, ArH), 4.87 (1H, s, β-CH), 3.30 (3H, s, OCH$_3$), 2.97 (4H, m, CHMe$_2$), 1.53 (6H, s, α-Me), 1.20 (12H, d, J=6.5 Hz, CHMeMe'), 1.16 (12H, d, J=6.5 Hz, CHMeMe').

[(BDI$^{iPr}$)ZnO$^i$Pr]$_2$. 2-Propanol (49 μl, 0.644 mmol) was added into a solution of [(BDI$^{iPr}$)ZnN(TMS)$_2$] (0.411 g, 0.638 mmol) in toluene (6 ml) at 20° C. After stirring 6 hrs. at 20° C., the colorless solution was dried in vacuo. The white solid was recrystallized from toluene (2 ml) at −30° C. (0.165 g, 54% yield). X-ray suitable crystal was grown from hexanes (15 ml) at 5° C. $^1$H NMR (C$_6$D$_6$, 300 MHz) δ7.08 (6H, m, ArH), 4.90 (1H, s, β-CH), 3.86 (1H, m, J=5.9 Hz, OCHMe$_2$), 3.16 (4H, m, J=7.0 Hz, CHMe$_2$), 1.63 (6H, s, α-Me), 1.37 (12H, d, J=7.0 Hz, CHMeMe'), 1.15 (12H, d, J=7.0 Hz, CHMeMe'), 0.90 (6H, d, J=5.9 Hz, OCHMe$_2$). X-ray diffraction analysis of the molecular structure revealed a dimeric species.

[(BDI$^{Et}$)MgOCH$_3$]$_2$. To a solution of dibutylmagnesium (1.0 M in heptane, 1.6 ml, 1.6 mmol, 1 eq) in toluene (10 ml) was slowly added (BDI$^{Et}$)H (0.563 g, 1.55 mmol, 1 eq) in toluene (10 ml) at 0° C. After stirring overnight at 80° C., the clear solution was dried in vacuo, giving a quantitative yield (0.688 g) of [(BDI$^{Et}$)MgBu]. To [(BDI$^{Et}$)MgBu] (0.688 g, 1.55 mmol, 1 eq) in toluene (30 ml) was added methanol (0.070 ml, 1.72 mmol, 1.1 eq) at RT. After stirring for an hour at RT, the clear solution was dried in vacuo and then recrystallized from a minimum amount of toluene at −30° C. (0.413 g, 64%). Analysis of the compound by X-ray crystallography revealed that the compound exists as the dimer in the solid state.

(BDI$^{iPr}$)MgN(SiMe$_3$)$_2$. To a solution of (BDI$^{iPr}$)H (2.045 g, 4.883 mmol) in toluene (20 ml) was added a solution of magnesium bis(trimethylsilyl)amide (1.707 g, 4.947 mmol) in toluene (20 ml). After stirring for 18 h at 80° C., the solvent was removed in vacuo to give (BDI$^{iPr}$)MgN(SiMe$_3$)$_2$ in quantitative yield. The light yellow solid was recrystallized from toluene at −30° C. to yield colorless blocks (2.48 g, 84% yield). $^1$H NMR (C$_6$d$_6$, 300 HHz): δ7.12 (6H, br, ArH), 4.80 (1H, s, β-CH), 3.20 (4H, m, J=7.0 Hz, CHMe$_2$), 1.62 (6H, s, α-Me), 1.36 (12H, d, J=7.0 Hz, CHMeMe), 1.14 (12H, d, J=7.0 Hz, CHMeMe), 0.01 (18H, s, CH$_3$) ppm; $^{13}$C{$^1$H} NMR (C$_6$D$_6$, 75 MHz): δ170.43, 144.19, 141.86, 125.72, 123.95, 95.29, 28.69, 24.57, 24.39, 24.29, 5.05 ppm.

[(BDI$^{iPr}$)MgO$^i$Pr]$_2$. To a solution of (BDI$^{iPr}$)MgN(SiMe$_2$)$_2$ (0.558 g, 0.926 mmol) in toluene (8 ml) was added 2-propanol (78 μl, 1.03 mmol). After stirring for 4 h at RT, the resulting white slurry was dried in vacuo. The white solid was then recrystallized from toluene (30 ml) at RT to yield [(BDI$^{iPr}$)MgO$^i$Pr]$_2$ as colorless blocks (0.302 g, 65% yield). $^1$H NMR (toluene-d$_s$, 300 MHz): δ7.07 (6H, m, ArH), 4.78 (1H, s, β-CH), 3.87 (1H, m, J=6.0 Hz. OCHMe$_2$), 3.45 (2H, m, J=7.0 Hz, CHMe$_2$), 3.11 (2H, m, J=7.0 Hz, CHMe$_2$), 1.45 (6H, s, α-Me), 1.36 (6H, d, J=7.0 Hz, CHMeMe), 1.23 (6H, d, J=6.0 Hz, OCHMe$_2$), 1.16 (6H, d, J=7.0 Hz, CHMeMe), 1.07 (6H, d, J=7.0 Hz, CHMeMe), 0.40 (6H, d, J=7.0 Hz, (CHMeMe) ppm; $^{13}$C{$^1$H} NMR (toluene-d$_s$, 75 MHz): δ169.25, 161.15, 146.49, 142.42, 140.89, 137.51, 136.05, 128.95, 128.19, 125.49, 125.32, 123.65, 123.23, 123.02, 93.90, 53.60, 28.28, 28.00, 24.13, 23.40, 23.09, 22.77, 21.05, 20.42, 20.14 ppm.

EXAMPLE II

Synthesis of Isotactic Poly(Lactic Acid) Using Catalyst of Structure (I) Where M is Zinc, R is OMe and $R_1$ is Ethyl The catalyst was synthesized as described in Example TV of U.S. Pat. No. 6,133,402.

In a drybox, the catalyst (4.4 mg, 4.8×10$^{-6}$ mol) was dissolved in toluene (1 ml) and was added to a solution of (R,R)-lactide (1.39 g, 9.6×10$^{-3}$ mol) in methylene chloride (20 ml) at 22° C. (monomer:Zn=1000:1). The reaction was stirred at room temperature for 170 minutes. After quenching the reaction with methanol (1 ml), the solution was concentrated in vacuo and the polymer was precipitated with excess methanol. The polymer was then dried in vacuo to constant weight (1.26 g, 91% yield). The product was isotactic poly ((R)-lactic acid) having a $M_n$ of 56,900 g/mol and $M_w/M_n$ of 1.44, determined by gel permeation chromatography, versus monodispersed polystyrene standards.

Isotactic poly ((S)-lactic acid is prepared the same as described in the above paragraph except that an equimolar amount of (S,S)-lactide is substituted for the (R,R)-lactide.

EXAMPLE III

Synthesis of Isotactic Poly(Lactic Acid) Using Catalyst of Structure (I) Where M is Magnesium, R is OMe and R, is Ethyl Synthesis was carried out the same as where isotactic poly ((R)-lactic acid) was prepared in Example II except that the catalyst was that of the Structure (I) where M is magnesium, R is OMe and $R_1$ is ethyl except that the reaction time was 5 minutes. The synthesis of the catalyst is described in Example I. The product was isotactic poly ((R)-lactic acid) having a $M_n$ of 401,000 and a $M_w/M_n$ of 1.74, determined by gel permeation chromatography, versus monodispersed polystyrene standards. The percent conversion was 90%.

Synthesis of poly ((S)-lactic acid is carried out in the same way as poly ((R)-lactic acid) is prepared in the paragraph directly above except that an equimolar amount of (S,S)-lactide is used in place of (R,R)-lactide.

EXAMPLE IV

Synthesis of Heterotactic Poly (Lactic Acid) Using Catalyst of Structure (I) Where M is Zinc, R is N($SiMe_3$) and $R_1$ is Ethyl The Catalyst was synthesized by reacting $Zn(N(TMS)_2)_2$ with a β-diimine. The $Zn(N(TMS)_2)_2$ was obtained commercially. The β-diimine was prepared by refluxing two equivalents of 2,6-diethyl aniline with 2,4-pentane dione as described in Feldman, J., et al., Organometallics 16, 1514–1516 (1997) except that 2,6-diethyl aniline is used in place of 2,6-diisopropyl aniline.

Heterotactic poly(lactic acid) was obtained by polymerizing rac-lactide (0.4 M in $CH_2Cl_2$) in the presence of the catalyst (mole ratio of rac-lactide to catalyst of 200:1) for 20 minutes at 20° C. Heterotactic poly(lactic acid) was obtained with a $M_n$ of 78,200 and a polydispersity of 2.17 (determined by gel permeation chromatography, versus monodispersed polystyrene standards), and a Pr of 0.79 (79% of the linkages formed are between lactide units of opposite stereochemistry).

EXAMPLE V

Syntheses of Heterotactic Poly (Lactic Acid)

The following procedure was used. In a drybox, catalyst as described in Table 1 below ($3.38 \times 10^{-5}$ mol) was dissolved in methylene chloride (1 ml) and the resulting solution was added to a solution of rac-lactide (0.975 g, $6.76 \times 10^{-3}$ mol) in methylene chloride (1.5 ml); the monomer to Zn molar ratio was 200:1. The reactions were stirred for the times and temperatures set forth in the Table 1 below. After a small sample of crude material was removed for characterization, the reaction was quenched with methanol (1 ml), the solution was concentrated in vacuo and the polymer was precipitated with excess methanol. The polymer was then dried in vacuo to constant weight and the percent conversion (% conv) was determined. The number average molecular weight $M_n$ and the polydispersity $M_w/M_n$ were determined by gel permeation chromatography versus monodispersed polystyrene standards. The racemic unit placement of Pr was determined by proton NMR. The conditions and results for each synthesis experiment are set forth in Tables 1a and 1b below where $(BDI^{iPr})ZnO^iPr$ is a dimeric species.

TABLE 1a

| CATALYST | TEMP (° C.) | [MONOMER]/ [METAL] | REACTION TIME |
|---|---|---|---|
| $(BDI^{iPr})ZnN(TMS)_2$ | 20 | 200 | 10 hrs |
| $(BDI^{iPr})ZnEt$ | 20 | 200 | 20 hrs |
| $(BDI^{iPr})ZnOAc$ | 20 | 200 | 70 hrs |
| $(BDI^{iPr})ZnN(TMS)_2$ | 0 | 200 | 60 hrs |
| $(BDI^{iPr})ZnEt$ | 0 | 200 | 5 days |
| $(BDI^{iPr})ZnOAc$ | 0 | 200 | 8 days |
| $(BDI^{iPr})ZnO^iPr$ | 20 | 200 | 20 min |
| $(BDI^{iPr})ZnO^iPr$ | 0 | 200 | 2 hrs |

TABLE 1b

| CATALYST | % CONV | $M_n(\times 10^{-4})$ (GPC) | $M_w/M_n$ (GPC | Pr |
|---|---|---|---|---|
| $(BDI^{iPr})ZnN(TMS)_2$ | 100 | 3.36 | 2.95 | 0.88 |
| $(BDI^{iPr})ZnEt$ | 100 | 6.33 | 1.83 | 0.91 |
| $(BDI^{iPr})ZnOAc$ | 92 | 0.614 | 2.07 | 0.87 |
| $(BDI^{iPr})ZnN(TMS)_2$ | 92 | 3.47 | 1.92 | 0.90 |
| $(BDI^{iPr})ZnEt$ | 94 | 7.62 | 2.88 | 0.95 |
| $(BDI^{iPr})ZnOAc$ | 93 | 4.76 | 1.49 | 0.94 |
| $(BDI^{iPr})ZnO^iPr$ | 95 | 3.79 | 1.10 | 0.90 |
| $(BDI^{iPr})ZnO^iPr$ | 95 | 3.88 | 1.09 | 0.94 |

FIG. 1 is a homonuclear decoupled $^1$H NMR spectrum of the methine region of the product formed listed first in Tables 1a and 1b, i.e., with $M_n$ of 33,600.

EXAMPLE VI

Synthesis of Syndiotactic Poly(Lactic Acid) Using Catalyst of Structure (I) where M is Zinc, R is Isopropoxide and $R_1$ is Isopropyl The synthesis of the catalyst is described in Example I.

A Schlenk flask was charged with 34 mM solution of the catalyst in methylene chloride. To this solution was added a 0.40 M solution of meso-lactide in methylene chloride (mole ratio of monomer:Zn of 200:1). The meso-lactide was prepared as described in Ovitt, T. M., et al., J. Am. Chem. Soc. 121, 4072–4073 (1999). The polymerization reaction was carried out at 20° C. for 4 hours. Syndiotactic poly(lactic acid) was obtained with a $M_n$ (kg/mol) of 22.4 and $M_w/M_n$ of 1.07 determined by gel permeation chromatography, versus monodispersed polystyrene standards. The percent conversion was 82%. The Pr was 0.76 which means that there were 76% racemic linkages between monomer units.

EXAMPLE VII

Synthesis of Atactic Poly(Lactic Acid) Using Catalyst of Structure (I) where M is Magnesium, R is Isopropoxide and $R_1$ is Isopropyl The synthesis of the catalyst is described in Example I.

Five runs were carried out. In each run, a Schlenk flask was charged with a solution of catalyst to which 2-propanol was added in methylene chloride. To this solution was added a 0.4 M solution of rac-lactide (purchased commercially) in methylene chloride. Reaction was carried out at 20° C.

Concentration ratios, time of reaction, conversion percent (as determined via integration of the methyl resonances of lactic acid and poly-lactic acid ($CDCl_3$, 300 MHz)), $M_n$ and $M_w/M_n$ are given in Table 2 below wherein LA stands for rac-lactide.

TABLE 2

| Entry | [LA]:[Mg]:[iPrOH] | t (min) | conversion (%) | $M_n$ (kg/mol) (GPC) | $M_w/M_n$ (GPC) |
|---|---|---|---|---|---|
| 1 | 50:1:1 | 1 | 97 | 11.0 | 1.20 |
| 2 | 100:1:1 | 2 | 97 | 17.7 | 1.28 |
| 3 | 200:1:1 | 2 | 97 | 29.7 | 1.29 |
| 4 | 300:1:1 | 5 | 98 | 39.8 | 1.33 |
| 5 | 500:1:1 | 5 | 96 | 55.3 | 1.35 |

Without the 2-propanol, $M_n$ was 64 kg/mol and the $M_w/M_n$ was 1.59, reaction being carried out using [Mg]=2 mM; [LA]=0.4 M; [LA]/[Mg]=200.

The gel permeation chromatography (GPC) analyses in the Examples were carried out using a Waters instrument (M510 pump, U6K injector) equipped with Waters UV486 and Milton Roy differential refractive detectors, and four 5 μm PL Gel Column (Polymer Laboratories; 100 Å, 500 Å, 1000 Å, and Mixed C porosities) in series. The GPC columns were eluted with tetrahydrofuran at 45° C. at 1 ml/min and were calibrated using 23 monodisperse polystyrene standards. The rac-lactide was purchased from Purac USA and used as received.

VARIATION

Many variations of the above will be obvious to those skilled in the art. Thus, the scope of the invention is defined by the claims.

What is claimed is:

1. A method for preparing isotactic poly ((R)-lactic acid) or isotactic poly ((S)-lactic acid) which comprises polymerizing respectively (R,R)-lactide or (S,S)-lactide in the presence of a catalyst which has a zinc center or a magnesium center, and two ligands where one of the ligands is a propagating group and the other of the ligands is not a propagating group, or is dimer thereof.

2. The method of claim 1 where the catalyst has the structure

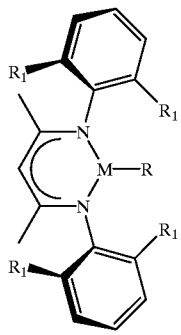

(I)

where M is selected from the group consisting of zinc and magnesium, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl and $R_1$ is selected from the group consisting of ethyl and isopropyl, or is dimer thereof.

3. The method of claim 2 wherein the catalyst has the structure (I) wherein M is magnesium, $R_1$ is ethyl and R is OMe or is dimer thereof.

4. Heterotactic poly(lactic acid).

5. A method for preparing heterotactic poly(lactic acid) which comprises polymerizing rac-lactide in the presence of a catalyst which has a zinc center and two ligands where one of the ligands is a propagating group and the other of the ligands is not a propagating group.

6. The method of claim 5 where the catalyst has the structure

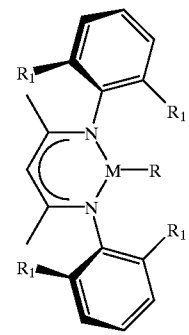

(I)

where M is zinc, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl and $R_1$ is selected from the group consisting of ethyl and isopropyl, or is dimer thereof.

7. A single-site catalyst for lactide polymerization containing a β-diiminate ligand which remains bound to a zinc center which is joined to a ligand which initiates polymerization.

8. The method of claim 6 wherein the catalyst has the structure (I) where R is $OR^2$ where $R^2$ is isopropyl and $R^1$ is isopropyl.

9. Catalyst having the structure

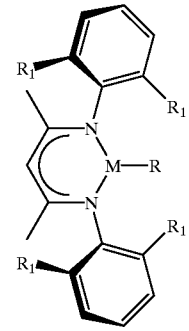

(I)

where M is magnesium, R is selected from the group consisting of OAc, $OR^2$ where $R^2$ is selected from the group consisting of $C_6$–$C_{20}$ aryl and $C_1$–$C_{20}$ alkyl, $N(SiMe_3)_2$ and $C_1$–$C_{20}$ alkyl and $R_1$ is selected from the group consisting of ethyl and isopropyl, or is dimer thereof.

10. The method of claim 7 wherein the catalyst has the structure (I) wherein R is $N(SiMe_3)_2$ and $R_1$ is isopropyl.

11. The catalyst of claim 7 having the structure:

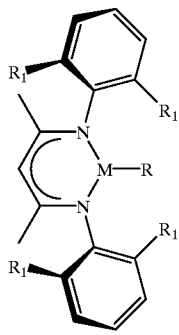

(I)

where M is zinc, R is OR² where R² is isopropyl and $R_1$ is isopropyl, or is dimer thereof.

12. The catalyst of claim 11 which is a dimer.

13. A method for preparing syndiotactic poly(lactic acid) which comprises polymerizing meso-lactide in the presence of a syndiotactic poly(lactic acid) effecting catalyst which has a zinc center and two ligands where one of the ligands is a propagating group and the other of the ligands is not a propagating group.

14. The method of claim 13 where the catalyst has the structure:

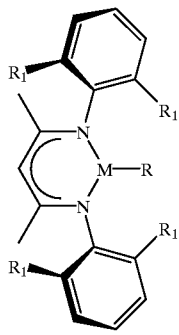

(I)

where M is zinc, R is selected from the group consisting of OAc, OR² where R² is selected from the group consisting of $C_6$–$C_{20}$ aryl and $C_1$–$C_{20}$ alkyl, N(SiMe₃)₂ and $C_1$–$C_{20}$ alkyl and $R_1$ is isopropyl, or is dimer thereof.

15. The method of claim 14 where the catalyst has the structure (I) where R is OR² where R² is isopropyl.

16. The method of claim 15 where the catalyst is a dimer.

17. A method for preparing atactic poly(lactic acid) with polydispersity $M_w/M_n$ ranging from 1.15 to 1.40 as determined by gel permeation chromatography versus monodispersed polystyrene standards, said method comprising polymerizing rac-lactide in the presence of a catalyst which has a magnesium center and two ligands where one of the ligands is a propagating group and the other of the ligands is not a propagating group, said polymerization being carried out in the presence of 0.5 to 2 equivalents of $C_1$–$C_4$ alcohol per mole of magnesium.

18. The method of claim 17 where the catalyst has the structure:

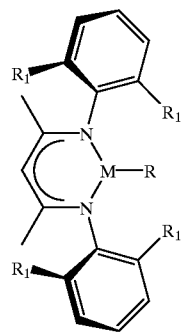

(I)

where M is magnesium, R is selected from the group consisting of OAc, OR² where R² is selected from the group consisting of $C_6$–$C_{20}$ aryl and $C_1$–$C_{20}$ alkyl, N(SiMe₃)₂ and $C_1$–$C_{20}$ alkyl and $R_1$ is selected from the group consisting of ethyl and isopropyl, or is dimer thereof.

19. The method of claim 18 where the catalyst has the structure (I) where R is OR² where R² is isopropyl and $R_1$ is isopropyl and is dimer, and the alcohol is isopropanol.

* * * * *

UNITED STATES PATENT AND TRADEMARK OFFICE
CERTIFICATE OF CORRECTION

PATENT NO.     : 6,316,590 B1
DATED          : November 13, 2001
INVENTOR(S)    : Geoffrey W. Coates et al.

It is certified that error appears in the above-identified patent and that said Letters Patent is hereby corrected as shown below:

Column 14,
Line 66, change "7" to -- 6 --.

Signed and Sealed this

Second Day of July, 2002

Attest:

Attesting Officer

JAMES E. ROGAN
Director of the United States Patent and Trademark Office